United States Patent
Schwartz et al.

(10) Patent No.: US 6,869,988 B2
(45) Date of Patent: Mar. 22, 2005

(54) SOLID SUPPORTED COMB-BRANCHED COPOLYMERS AS AN ADDITIVE FOR GYPSUM COMPOSITIONS

(75) Inventors: Steven A. Schwartz, Downingtown, PA (US); Frank J. Liotta, Jr., Collegeville, PA (US)

(73) Assignee: Arco Chemical Technology, L.P., Greenville, DE (US)

( * ) Notice: Subject to any disclaimer, the term of this patent is extended or adjusted under 35 U.S.C. 154(b) by 55 days.

(21) Appl. No.: 10/417,289

(22) Filed: Apr. 16, 2003

(65) Prior Publication Data

US 2004/0209979 A1 Oct. 21, 2004

(51) Int. Cl.[7] .............................................. C04B 24/32
(52) U.S. Cl. ............................................... 524/5; 524/4
(58) Field of Search ......................................... 524/4–5

(56) References Cited

U.S. PATENT DOCUMENTS

| | | |
|---|---|---|
| 4,184,887 A | 1/1980 | Lange et al. |
| 4,561,986 A | 12/1985 | Beck et al. |
| 4,927,463 A | 5/1990 | Kloetzer et al. |
| 5,118,751 A | 6/1992 | Schulze et al. |
| 5,286,412 A | 2/1994 | Northey et al. |
| 5,614,017 A | 3/1997 | Shawl |
| 5,670,578 A | 9/1997 | Shawl |
| 5,879,446 A | 3/1999 | Patel et al. |
| 5,985,989 A | 11/1999 | Shawl et al. |
| 5,990,232 A | 11/1999 | Shen et al. |
| 6,034,208 A | 3/2000 | McDaniel et al. |
| 6,171,388 B1 | 1/2001 | Jobbins |
| 6,214,958 B1 | 4/2001 | Le-Khac et al. |
| 6,527,850 B2 * | 3/2003 | Schwartz et al. ........... 106/772 |

FOREIGN PATENT DOCUMENTS

| | | |
|---|---|---|
| DE | 32 03 067 A1 A1 | 8/1982 |
| EP | 0 339 310 A1 A1 | 4/1989 |
| JP | 60-260459 | 12/1985 |
| JP | 6-206749 | 7/1994 |
| JP | 8-217507 | 8/1996 |
| WO | WO 01/07494 A1 A1 | 2/2001 |

* cited by examiner

Primary Examiner—Peter Szekely
(74) Attorney, Agent, or Firm—Brooks Kushman P.C.

(57) ABSTRACT

A gypsum composition suitable for use in the manufacture of gypsum products is provided. The gypsum composition includes gypsum, water, and a solid dispersant comprising a supported acrylic/polyether comb-branched copolymer. A method of making a gypsum composition is also provided. The method includes mixing together, in any combination, gypsum, water, and a solid dispersant comprising a supported acrylic/polyether comb-branched copolymer.

34 Claims, No Drawings

SOLID SUPPORTED COMB-BRANCHED COPOLYMERS AS AN ADDITIVE FOR GYPSUM COMPOSITIONS

BACKGROUND OF THE INVENTION

1. Field of the Invention

The present invention relates generally to gypsum compositions for making gypsum containing materials and is also directed to improved methods for making gypsum compositions.

2. Background Art

One of the most common materials used in the construction of walls and barriers is gypsum wallboard, sometimes referred to as "drywall," or "plaster board." Wallboard is conventionally produced by sandwiching a core containing an aqueous slurry of calcium sulfate hemihydrate between two sheets of board cover paper. Calcium sulfate hemihydrate is also known as stucco and gypsum. Examples of suitable methods and components for the construction of wallboard can be found in U.S. Pat. No. 6,527,850, which is incorporated herein by reference.

Gypsum is also used to form many other non-wallboard gypsum products. These include formulated plaster-based powders. Certain segments of the construction systems/building products markets make use of dry-bagged gypsum products composed of redispersible powders. In these instances, premixed gypsum plasters already contain the necessary additives to ensure good workability. Only water need be added by the plasterer. These types of applications include: gypsum concrete or gypsum cement for flowable, self-leveling flooring and subflooring; mortars and grouts for installation, patching, and repair materials; joint treatment compounds; and casting molds.

Gypsum is commonly manufactured by drying, grinding, and calcining natural gypsum rock. The drying step of gypsum manufacture includes passing crude gypsum rock through a rotary kiln to remove any free moisture accumulated in the rock from rain or snow, for example. The dried rock is then passed through a roller mill (a type of pulverizer), wherein the rock is ground to a desired fineness. The dried, ground gypsum is also known to as "land plaster."

The calcination step is performed by heating the ground gypsum rock, and is described by the following chemical equation:

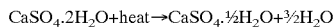

$$CaSO_4 \cdot 2H_2O + heat \rightarrow CaSO_4 \cdot \tfrac{1}{2}H_2O + \tfrac{3}{2}H_2O$$

This chemical equation shows that calcium sulfate dihydrate plus heat yields gypsum (calcium sulfate hemihydrate) plus water vapor. This process is conducted in a "calciner," of which there are several types known in the art. Various methods of producing gypsum are known in the art.

Gypsum is chemically reactive with water, and will "set" rather quickly when the two are mixed together. This setting reaction is a reversal of the above-described chemical reaction performed during the calcination step. The reaction proceeds according to the following equation:

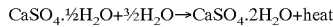

$$CaSO_4 \cdot \tfrac{1}{2}H_2O + \tfrac{3}{2}H_2O \rightarrow CaSO_4 \cdot 2H_2O + heat$$

In this reaction, the gypsum is rehydrated to its dihydrate state over a fairly short period of time. The actual time required for this setting reaction is generally dependent upon the type of calciner employed and the type of gypsum rock that is used and can be controlled within certain limits by the use of additives such as accelerators and retarders.

In the hydration reaction, hemihydrate gypsum is mixed with water until a suspension is formed that is fluid and workable. The hemihydrate gypsum dissolves until it forms a saturated solution. This saturated solution of hemihydrate is supersaturated with respect to dihydrate gypsum, and so the latter crystallizes out of the solution at suitable nucleation sites. Finally, as the dihydrate gypsum precipitates, the solution is no longer saturated with hemihydrate gypsum, so the hemihydrate gypsum continues to dissolve. Thus the process continues to consume the hemihydrate gypsum. The reaction can be followed by measuring the heat evolved. Initially there is very little reaction and no rise in temperature. This time is referred to as the induction period. As the amount of dihydrate gypsum increases, the mass thickness increases and the material hardens (sets).

In order to facilitate the above reaction and/or provide beneficial properties to the final product, various additives may also be included in the core gypsum slurry. For example, starch, set accelerators and/or set retarders, preservatives, and fiberglass may be included.

As described above, the setting reaction for gypsum involves the reaction of calcium sulfate hemihydrate with water to form calcium sulfate dihydrate. The theoretical (stoichiometric) water content of the slurry required for the reaction of calcium sulfate hemihydrate is about 18.7 weight percent. However, a relatively large amount of water is generally required to provide sufficient fluidity of the calcined gypsum slurry in order to obtain proper flow of the gypsum slurry in the manufacturing process. The amount of water required to provide proper fluidity depends upon various factors, such as the type of gypsum, particle size distribution, the various phases of gypsum in the stucco, source, and the levels of above-described additives conventionally used in minor amounts. This level (amount) of water may be expressed quantitatively as the "consistency". Consistency is defined as the volume of water required to produce a desired fluidity (flow) for 100 g of gypsum.

Alpha-type gypsum generally requires a consistency of about 34 to about 45 ml of water per 100 grams of gypsum in order to form a readily pourable and flowable gypsum slurry. Beta-type gypsum, on the other hand, typically requires a consistency of about 65 to about 75 ml of water per 100 grams of gypsum.

Certain "water reducing," "fluidity," or "consistency-decreasing," additives/agents have been used in order to improve the fluidity of the above-described gypsum slurry while allowing use of reduced levels of water. Reduction in water usage brings reduced costs in the form of reduced water and energy demands, as less water will have to be removed during the drying step(s). Reduction of water usage also provides environmental benefits.

Various commercially-available fluidity-enhancing, consistency-decreasing, and/or water-reducing agents, i.e., dispersion agents, are known in the art for various applications. Some typical dispersion agents used are calcium lignosulfonate, ammonium lignosulfonate, sodium lignosulfonate, and naphthalene sulfonate. The use of condensation products of naphthalene sulfonic acid and formaldehyde is also known. See also U.S. Pat. No. 4,184,887, the disclosure of which is hereby incorporated herein by reference. Calcium lignosulfonate, ammonium lignosulfonate and sodium lignosulfonate are believed to provide the ability to use reduced water levels, but they retard the set times of gypsum in the hydration reaction discussed above. Setting can be discussed in terms of the "initial" and the "final" set times. The initial set time corresponds to the time at which hydration reaction (setting) begins, while the final set time is the time at which the hydration reaction is completed.

U.S. patent application Ser. No. 2003-0019401-A1, assigned to the assignee of this application, discloses a liquid dispersant that has proven to be particularly useful in gypsum compositions. As many of the materials used with gypsum, and with gypsum itself, being solid, there is a need for solid dispersants that can be used with gypsum.

Accordingly, it would be advantageous to provide a gypsum product manufacturing process that employs the use of a solid consistency-decreasing additive without producing the deleterious set retarding effects found in the prior art. Moreover, it would also be further desirable to provide a gypsum product manufacturing process using a solid consistency-decreasing additive that improves the setting of the gypsum composition.

SUMMARY OF THE INVENTION

It has now been surprisingly discovered that the consistency of gypsum compositions can be decreased by incorporating into the gypsum composition a solid dispersant comprising a supported acrylic/polyether comb-branched copolymer.

Accordingly, at least one embodiment of the present invention comprises a gypsum composition suitable for use in the manufacture of gypsum products, such as construction materials. The gypsum composition includes: a) gypsum; b) water; and c) a solid dispersant comprising a supported acrylic/polyether comb-branched copolymer.

Moreover, at least another embodiment of the present invention comprises a method of making a gypsum composition suitable for use in the manufacture of gypsum products, such as construction materials. The method includes mixing together, in any combination: a) gypsum; b) water; and c) a solid dispersant comprising a supported acrylic/polyether comb-branched copolymer.

Furthermore, at least another embodiment of the present invention comprises a gypsum product. The gypsum product is made from the gypsum composition described above.

DETAILED DESCRIPTION OF THE PREFERRED EMBODIMENT(S)

Gypsum compositions made in accordance with the present invention comprise, at a minimum gypsum, water, and a solid dispersant comprising a supported acrylic/polyether comb-branched copolymer.

In at least one embodiment, the gypsum is preferably present in the gypsum compositions of the present invention in an amount of about 40 to about 75 weight percent, based on the weight of the gypsum composition, and more preferably about 50 to about 68 weight percent, and most preferably about 55 to about 65 weight percent. In at least one embodiment, the beta-hemihydrate form of gypsum is used with the invention. A preferred gypsum is available from the National Gypsum Corporation Research Center in Charlotte, N.C.

The gypsum can be produced by a dry calcination method, such as kettle, calcidyne, holoflyte, rotary kiln, impmill, or caludis peter calcination. Dry gypsum has a higher surface area than that produced by autoclave calcination (steam calcination). Gypsums produced by dry calcination methods have high surface energy, so they are generally more reactive than those produced by autoclave calcination. Because of high surface area, these gypsums require four to five times more water to produce a fluid slurry.

Calcium sulfate (gypsum) is described in the Kirk-Othmer Encyclopedia of Chemical Technology, Vol. 4, pages 812–26 (Fourth Edition 1992), and U.S. Pat. Nos. 6,171,388 and 5,879,446, the disclosures of which are hereby incorporated herein by reference.

In at least one embodiment, the water is preferably present in the gypsum composition of the present invention in an amount of about 25 to about 60 weight percent, based on the total weight of the gypsum composition, more preferably in an amount of about 32 to about 50 weight percent, and most preferably in an amount of about 35 to about 45 weight percent.

The dispersant of the present invention is a solid dispersant comprising a copolymer composition of the present invention supported on a support material. The support material can be any support material, either active or inactive, suitable for supporting the copolymer composition of the present invention. Preferred support materials include but are not necessarily limited to silica, silica fume, alumina, clay, and vermiculites. In at least one embodiment, the support material preferably has an average particle size of about 0.01 to about 2000 microns, more preferably about 0.01 to about 0.75 microns, even more preferably about 0.03 to about 0.5 microns, and yet even more preferably about 0.1 to about 0.3 microns.

In certain embodiments, the preferred support material is silica fume. When silica fume is used, suitable silica fume can be obtained from Norchem Concrete Products, Inc.® under the designation MMG-1, which is an uncompacted silica fume. Norchem Concrete Products, Inc.® is located in Hauppauge, N.Y.

In at least one embodiment, the amount of active dispersant (i.e., copolymer solids) is preferably present in the dispersant in an amount of about 1 to about 90% in weight percent, based on the total weight of the support material, more preferably about 5 to about 60% weight percent, and even more preferably about 10 to about 20 weight percent.

In a first embodiment, the copolymer composition comprises an acrylic/polyether comb-branched copolymer. The gypsum composition of the present invention preferably comprises the dispersant in an amount effective to decrease the consistency (i.e., increase the fluidity) of the gypsum composition relative to the consistency (or fluidity) of a similar gypsum composition not containing the effective amount of the dispersant.

In a second embodiment, the copolymer composition comprises an acrylic/polyether comb-branched copolymer and at least one inorganic setting accelerant. Preferably, two or more different inorganic setting accelerants are present in the copolymer composition of the second embodiment. Preferably, the inorganic setting accelerant component comprises an alkali metal sulfate, an alkali earth metal hydroxide, or a combination thereof. Most preferably, the inorganic setting accelerant component comprises both sodium sulfate and calcium hydroxide.

Preferably, the dispersant of the second embodiment is present in the gypsum composition in an amount effective to decrease the consistency and the set time of gypsum compositions relative to the consistency and initial set time of gypsum compositions not containing the effective amount of the dispersant of the second embodiment. When referring to set time in these instances, we are more specifically referring to the initial set time. This period relates to the initial hardening of the gypsum slurry during gypsum product manufacturing.

In the first and second embodiments, the copolymer is preferably present in the dispersant in an amount of about 0.001 to about 1.0 weight percent, based on the total weight of the gypsum in the gypsum composition, more preferably in an amount of about 0.005 to about 0.8 weight percent, and most preferably in an amount of about 0.01 to about 0.5 weight percent.

In the second embodiment, the inorganic setting accelerant component is present in an amount effective to decrease the initial set time of the gypsum composition. More preferably, the inorganic setting accelerant component is present in the dispersant in an amount of about 0.0001 to about 7 weight percent, based on the total weight of the gypsum in the gypsum composition, more preferably in an amount of about 0.1 to about 5 weight percent, and most preferably in an amount of about 0.1 to 3 weight percent.

When the inorganic setting accelerant component comprises sodium sulfate, the sodium sulfate is present in the dispersant in an amount of about 0.01 to about 5 weight percent, based on the total weight of the gypsum in the gypsum composition, more preferably in an amount of about 0.1 to about 3 weight percent, and most preferably in an amount of about 0.5 to about 2 weight percent.

When the inorganic setting accelerant component comprises calcium hydroxide, the calcium hydroxide is present in the dispersant in an amount of about 0.0001 to about 0.05 weight percent, based on the total weight of the gypsum in the gypsum composition, more preferably in an amount of about 0.001 to about 0.02 weight percent, and most preferably in an amount of about 0.001 to about 0.01 weight percent.

In a third embodiment, a portion of the acrylic/polyether comb-branched copolymer in the dispersant of the first and second embodiments can be replaced with commercially known fluidity agents, such as sodium- or calcium-based lignosulfonates and naphthalene sulfonates. In these instances, from about 20 to about 90 weight percent of the copolymer, based on the total weight of the copolymer, may be replaced with one or more of these commercially known fluidity agents, more preferably from about 25 to about 85 weight percent, and most preferably from about 30 to about 80 weight percent. The combination of the copolymer and the commercially known additives in the dispersant can reduce the amount of copolymer needed.

In each of the three embodiments, it is preferred that the comb-branched copolymer be fully or at least partially neutralized so that the pH of the copolymer composition is between about 2.0 and 14, more preferably between about 3 and 12.5, and most preferably between about 4 and 12. By partially neutralized, it is meant at least 5% neutralized, more preferably at least 50% neutralized, and most preferably at least 90% neutralized. The pH of the comb-branched copolymer can be neutralized by the addition of any suitable base to the copolymer composition. Examples of suitable bases include, but are not limited to, sodium hydroxide, potassium hydroxide (alkali metal), calcium hydroxide (alkaline earth metal), ammonia, alkyl amines as such as triethanolamine, diethanolamine, triisopropanolamine or the like (ammonium or organic amines) with the most preferred base being sodium hydroxide.

The dispersants of the present invention are preferably made by first preparing a copolymer composition, which is then preferably dissolved or dispersed in a liquid carrier (preferably water) and then converting the liquid in a manner to allow the dispersant copolymer to be utilized (delivered) in a solid-flowable form. This can be accomplished by blending the dispersant copolymer solution, for example, a comb-branched copolymer at a concentration ranging between about 20–60 weight percent in water, with either an active or inactive solid support material, by, for example, mixing, beating, pulverizing, or grinding until a solid, flowable composition is achieved. Alternatively, the copolymer dispersant solution or mixture of the copolymer dispersant solution with other solutions containing active or inactive ingredients may be spray-dried to produce precipitated or co-precipitated solid, powdery, flowable dispersant compositions. Other methods for converting copolymeric solutions into solid, flowable powders include: filtration, membrane separation, crystallization, evaporation, sublimation and freeze-drying.

The copolymer compositions for use with the first, second and third embodiments are each prepared by mixing the copolymer composition components at or about room temperature using conventional mixing equipment. A preferred procedure for preparing a copolymer composition for use with the present invention is as follows: the desired levels of the acrylic/polyether comb-branched copolymer (or the combination of the acrylic/polyether comb-branched copolymer and the commercially known fluidity agents) are diluted in water. If desired, full or partial neutralization is then achieved by the addition of base, until the desired pH is reached. Suitable bases include inorganic bases such as NaOH, KOH, $Na_2CO_3$, $NaHCO_3$ and inorganic bases, such as ammonia, monomethylamine, monoethylamine, monopropylamine, monobutylamine, dimethylamine, diethylamine, dipropylamine, dibutylamine, trimethylamine, triethylamine, tripropylamine, and tributylamine. This can be followed by the addition of sodium sulfate and calcium hydroxide. It should be noted that the sodium sulfate and the calcium hydroxide are only soluble in the copolymer compositions at the desired concentrations in the presence of the acrylic/polyether comb-branched copolymer that is the subject of this invention.

The acrylic/polyether comb-branched copolymer preferably has a molecular weight of 400 grams per mole to about 500,000 grams per mole, more preferably between about 600 grams per mole to about 400,000 grams per mole, and most preferably between about 1,000 grams per mole to about 100,000 grams per mole. The copolymer preferably has a mole ratio of acrylic monomer units to polyether units of about 1/99 to about 99/1, more preferably from about 1/1 to about 20/1, and most preferably from about 4/1 to about 20/1.

The comb-branched copolymer can be made by any suitable process for copolymerizing acrylic units with polyether units. In one preferred method, the copolymer is formed by reacting a polyether polymer or macromonomer with a polyacrylic acid polymer or acrylic monomer. The process may be continuous, batch or semi-batch. Following the copolymerization process, any relatively volatile unreacted monomers are generally stripped from the product.

More preferably, the comb-branched copolymer is made according to a process selected from the group consisting of (i) copolymerizing an unsaturated polyether macromonomer with at least one ethylenically unsaturated comonomer selected from the group consisting of carboxylic acids, carboxylic acid salts, hydroxyalkyl esters of carboxylic acids, and carboxylic acid anhydrides, and (ii) reacting a carboxylic acid polymer and (a) a polyether prepared by polymerizing a $C_2$–$C_4$ epoxide or (b) a polyether mixture comprising (1) a monofunctional polyether prepared by polymerizing a first epoxide selected from the group consisting of $C_2$–$C_4$ epoxides and mixtures thereof onto a monofunctional initiator and (2) a difunctional polyether prepared by polymerizing a second epoxide selected from the group consisting of $C_2$–$C_4$ epoxides and mixtures thereof, which may be the same as or different from the first epoxide, onto a difunctional initiator wherein the carboxylic acid polymer and the polyethers are reacted under conditions effective to achieve partial cleavage of the polyether and esterification of the polyether and cleavage products thereof by the carboxylic acid polymer, and (iii) polymerizing a polymerizable acid monomer containing at least one ethylenically unsaturated group in conjugation with a carboxyl group selected from the group consisting of carboxylic acid, carboxylic anhydride and carboxylic ester groups in a reaction medium comprising a polyether, wherein the polyether is prepared by polymerizing a $C_2$–$C_4$ epoxide, to form a carboxylic acid polymer; and reacting the carboxylic acid polymer and the polyether under conditions effective to achieve esterification of the polyether by the carboxylic acid polymer to form the comb-branched copolymer.

The preferred polyether macromonomer preferably comprises ethylene oxide and propylene oxide and has a molecular weight of about 300 grams per mole to about 100,000 grams per mole, more preferably between about 500 grams per mole to about 75,000 grams per mole, and most preferably between about 1,000 grams per mole to about 10,000 grams per mole. All molecular weights are number average molecular weights unless stated otherwise. Preferably, the ratio of propylene oxide (PO) to ethylene oxide (EO) of the polyether polymer or polyether macromonomer is preferably between about 99/1 to about 1/99, more preferably between about 80/20 to about 1/99, and most preferably between about 60/40 to about 1/99 by weight.

A preferred process for making the copolymer comprises: (a) forming a monomer stream, an initiator stream, and an optional chain transfer agent stream; (b) polymerizing the streams in a reaction zone at a temperature within the range of about −20° C. to about 150° C.; and (c) withdrawing a polymer stream from the reaction zone. This process is described in more detail in copending U.S. patent application Ser. No. 6,214,958, which is incorporated herein by reference.

The monomer stream contains an acrylic monomer and a polyether macromonomer. Suitable acrylic monomers are derived from acrylic acid and methacrylic acid. Preferred acrylic monomers include acrylic acid, methacrylic acid, their ammonium and alkali metal salts, their $C_1$ to $C_{10}$ alkyl and $C_6$ to $C_{12}$ aryl esters, and their amides. Acrylic acid, methacrylic acid, ammonium acrylate, ammonium methacrylate, sodium acrylate, sodium methacrylate, potassium acrylate, and potassium methacrylate are preferred. Most preferred are acrylic acid and methacrylic acid.

Suitable polyether macromonomers have a polyether chain and a single carbon-carbon double bond, which can be located either terminally or within the polyether chain. Examples include polyether monoacrylates, polyether monomethacrylates, polyether monoallyl ethers, polyether monomaleates, and polyether monofumarates. Further examples include the reaction product of a hydroxyl-functional polyether with isocyanatoalkyl(meth)acrylates such as isocyanatoethylacrylate, and with ethylenically unsaturated aryl isocyanates. The polyether of the macromonomer is an alkylene oxide polymer having a number average molecular weight within the range of about 500 to about 10,000. Suitable alkylene oxides include ethylene oxide, propylene oxide, butylene oxide, and the like, and mixtures thereof. The polyether macromonomers preferably have hydroxyl functionality from 0 to 5. They can be either linear or branched polymers, homopolymers or copolymers, random or block copolymers, diblock or multiple-block copolymers.

Examples of polyether macromonomers are poly (propylene glycol) acrylates or methacrylates, poly(ethylene glycol) acrylates or methacrylates, poly(ethylene glycol) methyl ether acrylates or methacrylates, acrylates or methacrylates of an oxyethylene and oxypropylene block or random copolymer, poly(propylene glycol) allyl ether, poly (ethylene glycol) allyl ether, poly(propylene glycol) monomaleate, and the like, and mixtures thereof. Preferred polyether macromonomers are poly(propylene glycol) acrylates or methacrylates, poly(ethylene glycol) acrylates or methacrylates, acrylates or methacrylates of an oxyethylene and oxypropylene block and/or random copolymer. More preferred are acrylates or methacrylates of an oxyethylene and oxypropylene block and/or random copolymer.

The ratio of acrylic monomer to polyether macromonomer is determined by many factors within the skilled person's discretion, including the required physical properties of the comb-branched copolymer, the selection of the acrylic monomer, and the properties of the polyether macromonomer. The ratio generally is within the range from 1/99 to 99/1 by weight. The preferred range is from 5/95 to 75/25.

In one embodiment, the macromonomer is made by (a) oxyalkylating an initiator molecule selected from the group consisting of hydroxyalkyl acrylates, hydroxyalkyl methacrylates, and monounsaturated monocarboxylic acids with an alkylene oxide in the presence of an effective amount of a double metal cyanide complex catalyst under conditions effective to form a well-defined unsaturated macromonomer having a terminal hydroxyl functionality and not more than substantially one initiator molecule per unsaturated macromonomer molecule. This method is described in substantial detail in U.S. Pat. No. 6,034,208, which is incorporated herein by reference. Also, the macromonomer described in U.S. Pat. No. 6,034,208 in addition to being reacted in the manner described in the preferred continuous process described herein, can be reacted with the comonomer in the manner described in U.S. Pat. No. 6,034,208.

Optionally, the monomer stream contains a third monomer. The third monomer is preferably selected from vinyl aromatics, vinyl halides, vinyl ethers, vinyl esters, vinyl pyrrolidinones, conjugated dienes, unsaturated sulfonic acids, unsaturated phosphonic acids, and the like, and mixtures thereof. The amount of third monomer used depends on the required physical properties of the comb-branched copolymer product, but is preferably less than 50% by weight of the total amount of monomers.

Optionally, the monomer stream also includes a solvent. The solvent is used to dissolve the monomer, to assist heat transfer of the polymerization, or to reduce the viscosity of the final product. The solvent is preferably selected from water, alcohols, ethers, esters, ketones, aliphatic hydrocarbons, aromatic hydrocarbons, halides, and the like, and mixtures thereof. Selections of solvent type and amount are determined by the polymerization conditions including reaction temperature. Water and alcohols, such as methanol, ethanol, and isopropanol are preferred.

The initiator stream contains a free radical initiator. The initiator is preferably selected from persulfates, hydrogen peroxide, organic peroxides and hydroperoxides, azo compounds, and redox initiators such as hydrogen peroxide plus ferrous ion. Persulfates, such as ammonium and potassium persulfate, are preferred.

Optionally, the initiator stream contains a solvent. The solvent is used to dissolve or dilute the initiator, to control the polymerization rate, or to aid heat or mass transfer of the polymerization. Selections of solvent type and amount are determined by the nature of the initiator and the polymerization conditions. Water and alcohols such as methanol, ethanol, and isopropanol are preferred when persulfate is used as the initiator.

The monomer and initiator streams optionally include a chain transfer agent. Suitable chain transfer agents include alkyliodides and bromides, branched lower alcohols such as isopropanol, alkyl amines, alkyl sulfides, alkyl disulfides, carbon tetrahalides, allyl ethers, and mercaptans. Mercaptans, such as dodecyl mercaptan, butyl mercaptan, mercaptoacetic and mercaptopropionic acids, are preferred.

Under some conditions, it is preferred to add the chain transfer agent in a separate stream. This is particularly desirable when the chain transfer agent causes decomposition of the initiator or polymerization of the monomer once it is mixed with those components. This is particularly important in a large, commercial scale because these reactions can cause safety problems.

Optionally, the chain transfer agent stream contains a solvent that is used to dissolve or dilute the chain transfer agent. Suitable solvents include water, alcohols, ethers, esters, ketones, aliphatic and aromatic hydrocarbons, halides, and the like, and mixtures thereof. Selections of solvent type and amount are determined by the nature of the chain transfer agent and the polymerization conditions. Water and alcohols, such as methanol, ethanol, and isopropanol, are preferred.

The monomer stream, initiator stream, and optional chain transfer agent stream are polymerized in a reaction zone. The reaction temperature is preferably kept essentially constant during the polymerization. The temperature is determined by a combination of factors including the desired molecular weight of the comb-branched polymer product, the initiator type and concentration, the monomer type and concentration, and the solvent used. The reaction is performed at a temperature within the range of about $-20°$ C. to about $150°$ C., preferably, within the range of about $20°$ C. to about $90°$ C. Most preferred is the range of about $40°$ C. to about $60°$ C.

The addition rate of each stream depends on the desired concentration of each component, the size and shape of the reaction zone, the reaction temperature, and many other considerations. In general, the streams flow into the reaction zone at rates that keep the initiator concentration within the range of about 0.01% to about 1% by weight, and the chain transfer agent concentration within the range of about 0.1% to about 1.5% by weight.

The reaction zone is where the polymerization takes place. It can be in the form of a tank reactor, a tubular reactor, or any other desirably shaped reactor. The reaction zone is preferably equipped with a mixer, a heat transfer device, an inert gas source, and any other suitable equipment.

As the streams are polymerized in the reaction zone, a polymer stream is withdrawn. The flow rate of the polymer stream is such that the reaction zone is mass-balanced, meaning that the amount of material that flows into the reaction zone is equal to the amount of material withdrawn from the reaction zone. The polymer stream is then collected.

The comb-branched copolymer may also be made according to a multiple-zone process. A multiple-zone process is similar to the process discussed above except that more than one reaction zone is used. In a multiple-zone process, a first polymer stream is withdrawn from a first reaction zone and transferred into a second reaction zone where the polymerization continues. A second polymer stream is withdrawn from the second reaction zone. More than two reaction zones can be used if desirable. The reaction temperature in the second reaction zone can be the same as or different from the first reaction zone. A multiple-zone process can enhance monomer conversion and increase efficiency of the process. Usually, in the first polymer stream, the monomer conversion is within the range of about 65% to 85% by weight. The second reaction zone preferably brings the monomer conversion to 90% or greater.

In a second preferred process, the comb-branched copolymer used in accordance with the present invention can be made by reacting (a) a carboxylic acid polymer and (b) a polyether macromonomer prepared by polymerizing a $C_2$–$C_4$ epoxide or (c) a polyether mixture comprising (1) a monofunctional polyether prepared by polymerizing a first epoxide selected from the group consisting of $C_2$–$C_4$ expoxides and mixtures thereof onto a monofunctional initiator and (2) a difunctional polyether prepared by polymerizing a second epoxide selected from the group consisting of $C_2$–$C_4$ epoxides and mixtures thereof, which may be the same as or different from the first epoxide, onto a difunctional initiator wherein the carboxylic acid polymer and the polyethers are reacted under conditions effective to achieve partial cleavage of the polyether and esterification of the polyether and cleavage products thereof by the carboxylic acid polymer. These methods are described in substantial detail in U.S. Pat. Nos. 5,614,017 and 5,670,578 which are incorporated herein by reference.

In a third preferred process, the comb-branched copolymer used in accordance with the present invention can be made by polymerizing a polymerizable acid monomer containing at least one ethylenically unsaturated group in conjugation with a carboxyl group selected from the group consisting of carboxylic acid, carboxylic anhydride and carboxylic ester groups in a reaction medium comprising a polyether, wherein the polyether is prepared by polymerizing a $C_2$–$C_4$ epoxide, to form a carboxylic acid polymer; and reacting the carboxylic acid polymer and the polyether under conditions effective to achieve esterification of the polyether by the carboxylic acid polymer to form the comb-branched copolymer. This method is described in substantial detail in U.S. Pat. No. 5,985,989 which is incorporated herein by reference.

Other dry ingredients may also be included in the gypsum composition, including an accelerator which can be used to control, within certain limits, the crystal growth rate and set time of the stucco. Examples of suitable accelerators include ball mill accelerators ("BMA"), NaCl, $CaCl_2$, $Na_2CO_3$, and $K_2SO_4$, although others are known to those of skill in the art. Both potassium sulfate and ball mill accelerators may be used.

Other wet ingredients may also be included in the gypsum composition. Examples include an aqueous slurry or solution of paper pulp. The pulp solution can comprise water and paper fibers ("paper pulp"), and may also include corn starch and/or potash. A retarder optionally may be included in the paper pulp solution and is used in conjunction with the aforementioned accelerator in order to tailor the set time of the gypsum composition. Retarders that may be used include sodium citrate, sodium phosphate and the like.

The gypsum compositions of the present invention are made by using conventional mixing equipment at room temperature to mix the components. Generally, the gypsum compositions are prepared by swiftly mixing the gypsum and the solid dispersant with an aqueous solution to form an aqueous slurry.

The gypsum product can be made according to any known method as long as the dispersant is added to the gypsum composition. One process for manufacturing the gypsum products in accordance with the invention initially includes the premixing of dry ingredients in a mixing apparatus. The dry ingredients preferably include gypsum, the dispersant, an optional accelerator, and an antidesiccant (e.g., starch), as described below in greater detail. The dry ingredients are typically mixed together with a "wet" (aqueous) portion of the gypsum product composition.

The wet portion comprises water. A set retarder can also be included. The water supplied in the wet portion of the composition should include sufficient water for the setting reaction of the gypsum, plus an additional amount to decrease the consistency of the slurry during the manufacturing process.

The produced gypsum composition slurry is then allowed to cure or set, whereby calcium sulfate hemihydrate is converted to calcium sulfate dihydrate. The product is then preferably dried by exposing the product to heat, in order to remove excess water not consumed in the reaction forming the calcium sulfate dihydrate.

The setting reaction produces gypsum crystals, which are interwoven to contribute strength to the gypsum product. The crystal-to-crystal interaction is important to the final strength of the gypsum product. If the final product includes paper fibers, such as it would for wallboard, the gypsum crystals also preferably interlock with paper fibers protruding from the surface or cover papers, thus bonding the wallboard papers to the core. This bonding or interaction also increases the strength of the wallboard product.

The use of the dispersant of the present invention reduces the amount of water required to manufacture gypsum products. The alteration of the water-to-gypsum ratio may have several effects on the gypsum product. First, a low water-to-gypsum ratio will generally decrease the porosity of the final gypsum product, as the water present in the slurry will generally increase porosity in the final product. The lower water usage will increase the effect of the crystal growth during setting because available nucleating sites are concentrated into a smaller volume of the mix. Interaction of growing gypsum crystals occurs earlier and is more effective, and is therefore believed to provide improved strength in the final products of the invention.

Moreover, in general, strength properties are also increased by using less water to fluidize the gypsum slurry. The reduced drying requirement also provides the potential to increase line speed, providing a large commercial advantage of the invention.

The following examples merely illustrate the present invention. Those skilled in the art will recognize many variations that are within the spirit of the present invention and scope of the claims.

EXAMPLE 1
Preparation of Comb-Branched Copolymer

A polyether macromonomer that is an acrylate of oxyethylene/oxypropylene random copolymer having oxyethylene/oxypropylene ratio 70/30 by weight and number average molecular weight $M_n$ of 3,000 (122.5 g, 0.0408 mole) made in accordance with the process described in U.S. Pat. No. 6,034,208, acrylic acid (17.6 g, 0.245 mole), mercaptopropionic acid (1.2 g) and ammonium persulfate (0.70 g) are charged into a one-liter reactor. The reactor is equipped with a stirrer, a temperature controller, a heating coil, a nitrogen purge device, a monomer addition pump, an initiator addition pump, and a sample outlet. The reactor contents are purged with $N_2$ for 20 minutes. Additional polyether macromonomer (245 g, 0.0817 mole), made in the same manner described above, acrylic acid (35.4 g, 0.492 mole), mercaptopropionic acid (2.6 g) and deionized water (DI water) (145 g) are mixed. The mixture is purged with $N_2$ for 20 minutes and the charged into the monomer pump. Ammonium persulfate (1.4 g) is dissolved in DI water (153 g). The solution is purged with $N_2$ for 20 minutes and then charged into the initiator pump. The reactor contents are heated to 40° C. The monomer mixture and the initiator solution are continuously pumped into the reactor at the rates of 1.0 gram/min and 0.33 gram/min, respectively. The product is continuously withdrawn from the reactor at a rate of 1.33 gram/min. It has a number average molecular weight $M_n$: 45,000, and molecular weight distribution $M_w/M_n$: 1.42.

EXAMPLE 2

A. Materials
 1. Polymer of Example 1.
 2. 33 wt. % KOH solution (in water).
 3. Silica Fume (Norchem® MMG-1, uncompacted).

B. The unneutralized aqueous polymer solution from Example 1 was 100% neutralized using KOH. This corresponds to complete conversion of acrylic acid backbone comonomers to the corresponding potassium salt. This was achieved by adding 6.76 g of a 33 wt. % aqueous solution of KOH to 50 g of a 45.5 wt. % aqueous solution of the polymer. The polymer concentration in the resulting aqueous solution is 40.2 wt. %.

C. As set forth in more detail below, silica fume was added incrementally to the aqueous, neutralized polymer solution and mixing at high speed was conducted until no change in appearance or consistency of the sample was observed.

To 52 grams of the polymer solution described in Example 2B, the following amounts of silica fume (MMG-1) were added at various time increments and the following comments were noted:

| Grams | Comments |
| --- | --- |
| 14.03 | Homogeneous wet slurry |
| 30.57 | Thick paste, homogeneous |
| 50.02 | Clumpy mud; not homogeneous |
| 60.47 | Clumpy mud; not homogeneous |
| 100.38 | Big clumps, not homogeneous |
| 127.99 | Smaller clumps, more grindable |
| 138.07 | Homogeneous granular blend |

It should be noted that the values on the left side of the above table represent the total amount of silica fume in the mixture, not incremental amounts. For instance, the second amount that is added is 16.54 grams. As such, the total weight of the resultant polymer solution/silica fume mixture was 190.07 grams.

The final composition of the sample described in Example 2C is:

| Ingredient | Wt. % |
| --- | --- |
| Polymer solids (actives) from Example 2B | 11.0 |

-continued

| Ingredient | Wt. % |
|---|---|
| Water | 16.4 |
| Silica fume | 72.6 |

EXAMPLE 3

Example 3 was prepared in essentially the same manner as Example 2 except that the copolymer of Example 1 was only 50% neutralized with KOH.

This was achieved by adding 6.76 g of a 33 wt. % aqueous solution of KOH to 100 g of a 45.5 wt. % aqueous solution of the polymer.

To 49 grams of the polymer solution described in Example 3, the following amounts of silica fume (MMG-1) were added at various time increments.

| Grams |
|---|
| 30.49 |
| 60.88 |
| 88.84 |
| 105.37 |
| 116.9 |
| 141.49 |

The total weight of the resultant polymer solution/silica fume mixture was 190.49 grams.

The final composition of the sample described in Example 3 is:

| Ingredient | Wt. % |
|---|---|
| Polymer solids from Example 3 | 11.0 |
| Water | 14.8 |
| Silica fume | 74.2 |

Example 3 would not produce a flowable copolymer composition. It had a tar-like consistency.

EXAMPLE 4

The fluidities of various gypsum compositions containing various dispersant candidates were tested.

The gypsum compositions were tested in the following manner. The dispersing ability of the dispersant candidates was measured utilizing a test patterned after ASTM C472. The test is used to determine the amount of water that is required to produce a gypsum composition of a specific viscosity. The desired viscosity reflects the fluidity necessary to obtain proper flow of the gypsum slurry in the manufacturing process. This amount is called the "consistency," and it is defined as the volume of water required to produce the desired viscosity for 100 g of calcined gypsum ($CaSO_4 \cdot \frac{1}{2}H_2O$).

consistency=ml $H_2O$/100 g gypsum

Gypsum compositions were prepared by swiftly adding 50 g of the calcined gypsum, a blend of calcined gypsum and solid support such as silica fume, or a blend of calcined gypsum and a solid support such as silica fume onto which the comb-branched copolymer of Example 2B is adsorbed into an 8 ounce expandable polystyrene cup containing either water alone, an aqueous solution containing the dissolved copolymer. The gypsum composition was gently hand-agitated for 60 seconds using a ¾ inch metal spatula in order to provide uniform wetting of the calcined gypsum. This was immediately followed by more vigorous mixing, using the same spatula, for 30 seconds at a rate of about 160 strokes/minute. Then, the gypsum composition was immediately poured out of the cup in one continuous motion from a height of 90 mm onto a clean, glass plate. The diameter of the resulting circular patty was then measured.

The gypsum (Beta-type $CaSO_4 \cdot \frac{1}{2}H_2O$) used for these measurements was obtained from National Gypsum Corporation Research Center in Charlotte, N.C.

The compositions and the results are shown in Table 1 below:

TABLE 1

Results (For All Formulations, wt % of polymer actives (solids), based on the weight of gypsum and silica fume (if present) = 0.5%.)

| | Samples | | | |
|---|---|---|---|---|
| | A | B | C | D |
| Gypsum | 50 | 48.35 | 48.36 | 48.34 |
| $H_2O$ | 40 | 40 | 28 | 28 |
| Silica Fume | | 1.65 | 1.64 | |
| Example 2B | | | 0.61 | |
| Example 2C | | | | 2.29 |
| Patty Diam (mm) | 110 | 102 | 111 | 119 |

From the above, table, it can be observed that the supported copolymer of Example 2C introduced to the gypsum slurry gave more flow (higher patty diameter) than a gypsum slurry containing a similar level of support and the unsupported copolymer of Example 2B.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A gypsum composition suitable for use in the manufacture of gypsum products, said gypsum composition comprising:
    a) gypsum;
    b) water; and
    c) a solid dispersant comprising a supported acrylic/polyether comb-branched copolymer.

2. The gypsum composition of claim 1 wherein the copolymer is supported on a particulate support material.

3. The gypsum composition of claim 1 wherein the dispersant is present in an amount effective to decrease the consistency of the gypsum composition relative to the consistency of a similar gypsum composition not containing the effective amount of the dispersant.

4. The gypsum composition of claim 1 wherein the dispersant is present in the gypsum composition in an amount effective to result in the copolymer being present in the gypsum composition in an amount of 0.001 to 1.0 weight percent, based on the total weight of the gypsum composition.

5. The gypsum composition of claim 1 wherein the dispersant further comprises at least one inorganic setting accelerant selected from the group consisting of alkali metal sulfates, alkali earth metal hydroxides, and combinations thereof.

6. The gypsum composition of claim 5 wherein the inorganic setting accelerant comprises sodium sulfate and calcium hydroxide.

7. The gypsum composition of claim 5 wherein the dispersant is present in an amount effective to decrease the consistency and initial set time of the gypsum composition relative to the consistency and initial set time of a similar gypsum composition not containing the effective amount of the dispersant.

8. The gypsum composition of claim 2 wherein the support material comprises an inactive support material.

9. The gypsum composition of claim 2 wherein the support material comprises silica fume.

10. The gypsum composition of claim 9 wherein the silica fume has an average particle size of 0.1 to 0.3 microns.

11. The gypsum composition of claim 2 wherein the support materials comprises a material selected from a group consisting of silica, silica fume, alumina, clay, and vermiculites.

12. The gypsum composition of claim 9 wherein the copolymer actives is present on the dispersant in an amount of about 5–60 weight percent, based on the total weight of the support material.

13. The gypsum composition of claim 2 wherein the copolymer actives is present on the dispersant in an amount of about 5–60 weight percent, based on the total weight of the support material.

14. The gypsum composition of claim 1 wherein the copolymer is at least partially neutralized.

15. The gypsum composition of claim 1 wherein the copolymer is fully neutralized.

16. The gypsum composition of claim 2 wherein the particulate support material has an average particle size of about 0.1 to about 2000 microns.

17. The gypsum composition of claim 1 wherein the pH of the copolymer is between about 4 and 12.

18. A method of making a gypsum composition suitable for use in the manufacture of gypsum products, said method comprising mixing together, in any combination,:
  a) gypsum;
  b) water; and
  c) a solid dispersant comprising a acrylic/polyether comb-branched copolymer supported on a support material.

19. The method of claim 18 wherein the dispersant is provided in an amount effective to decrease the consistency of the gypsum composition relative to the consistency of a similar gypsum composition not containing the effective amount of the dispersant.

20. The method of claim 18 wherein the dispersant is provided in the gypsum composition in an amount effective to result in the copolymer being present in the gypsum composition in an amount of 0.001 to 1.0 weight percent, based on the total weight of the gypsum composition.

21. The method of claim 18 wherein the dispersant further comprises at least one inorganic setting accelerant selected from the group consisting of alkali metal sulfates, alkali earth metal hydroxides, and combinations thereof supported on the support material.

22. The method of claim 21 wherein the inorganic setting accelerant comprises sodium sulfate and calcium hydroxide.

23. The method of claim 18 wherein the pH of the copolymer is between about 4 and 12.

24. The method of claim 18 wherein the copolymer is supported on a particulate support material.

25. The method of claim 24 wherein the support material is an inactive support material.

26. The method of claim 16 wherein the support material comprises silica fume.

27. The method of claim 18 wherein the support materials comprises a material selected from a group consisting of silica, silica fume, alumina, clay, and vermiculites.

28. The method of claim 24 wherein the copolymer actives is present on the dispersant in an amount of about 5–60 weight percent, based on the total weight of the support material.

29. The method of claim 26 wherein the silica fume has an average particle size of about 0.1 to about 0.3 microns.

30. The method of claim 18 wherein the copolymer is at least partially neutralized.

31. The method of claim 18 wherein the copolymer is fully neutralized.

32. The method of claim 18 wherein the dispersant also comprises an additive selected from the group consisting of naphthalene sulfonate and calcium-based lignosulfonate supported on the support material.

33. A gypsum product comprising:
  the set product of the gypsum composition of claim 1.

34. A gypsum product comprising:
  the set product of the gypsum composition made in accordance with the method of claim 18.

* * * * *